C. H. LA CROIX.
WAGON.
APPLICATION FILED SEPT. 11, 1916.
1,212,232.
Patented Jan. 16, 1917.
2 SHEETS—SHEET 1.
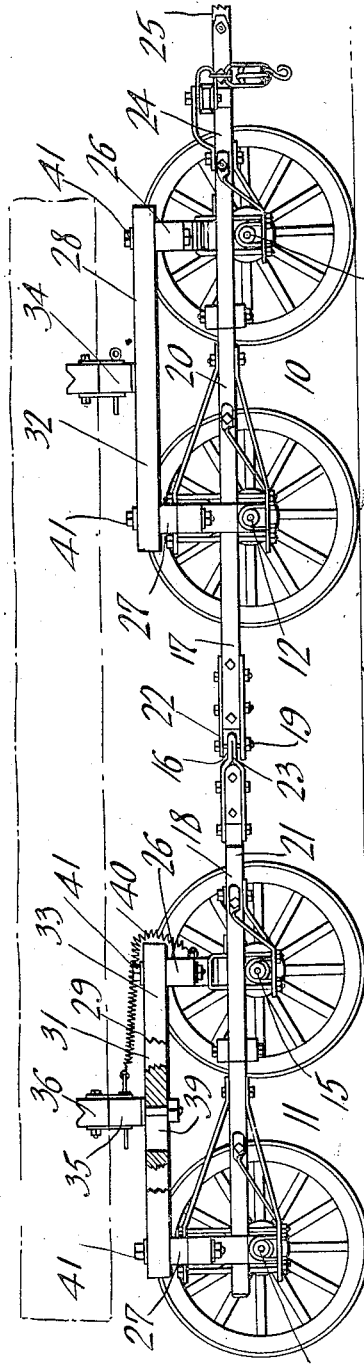
Fig. 1.
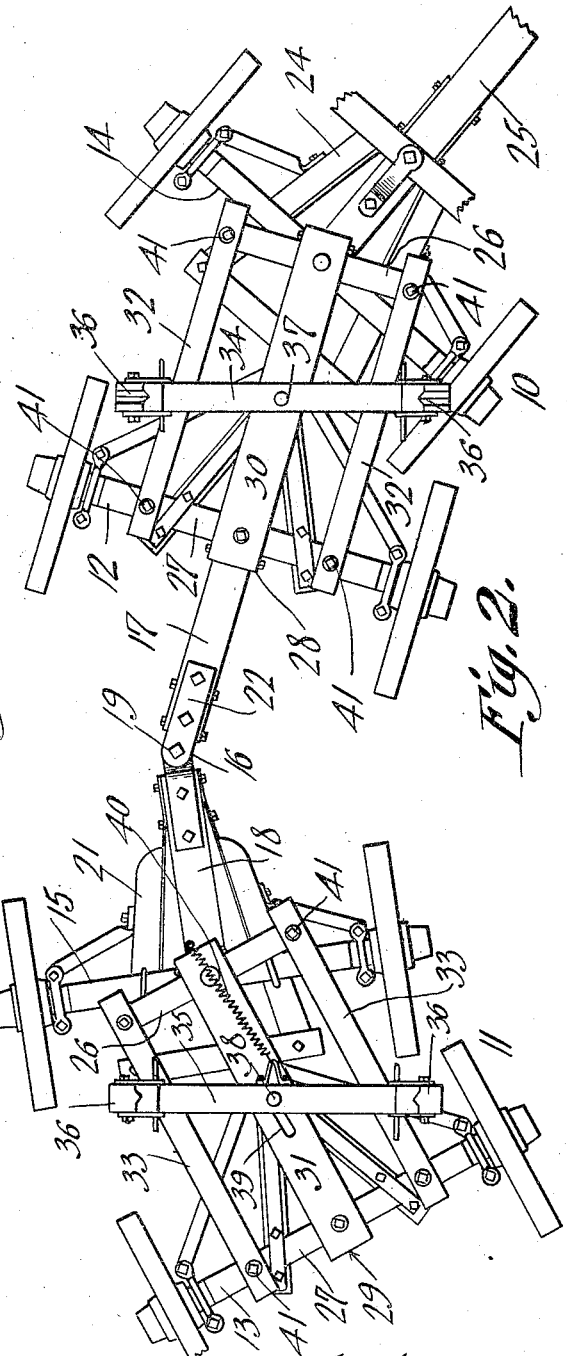
Fig. 2.
Witnesses
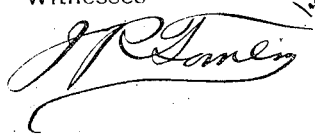
C. H. La Croix   Inventor
by Ashno & Co.
Attorneys C. H. LA CROIX.
WAGON.
APPLICATION FILED SEPT. 11, 1916.
1,212,232.
Patented Jan. 16, 1917
2 SHEETS—SHEET 2.
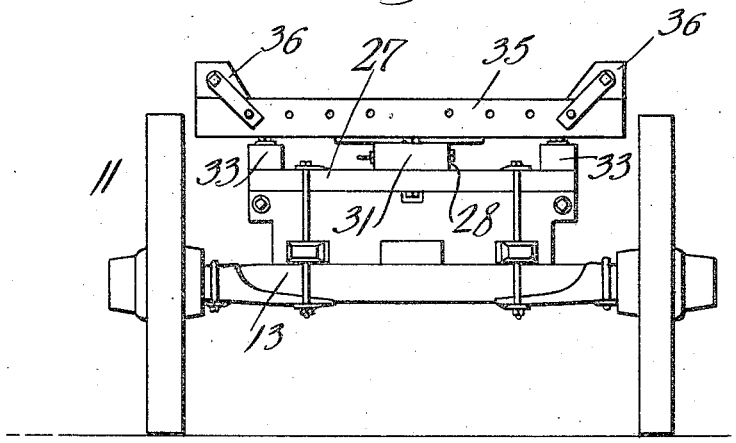
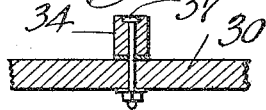
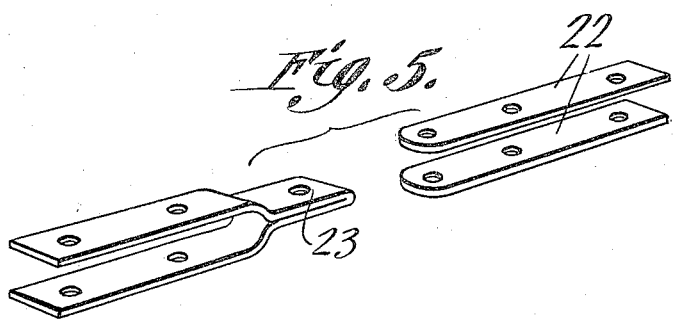

UNITED STATES PATENT OFFICE.

CICERO H. LA CROIX, OF BANNISTER, TEXAS.

WAGON.

1,212,232.

Specification of Letters Patent.   Patented Jan. 16, 1917.

Application filed September 11, 1916.   Serial No. 119,571.

*To all whom it may concern:*

Be it known that I, CICERO H. LA CROIX, a citizen of the United States, residing at Bannister, in the county of San Augustine and State of Texas, have invented a new and useful Wagon, of which the following is a specification.

The object of the invention is to provide a vehicle of a convertible type consisting of a plurality of members or elements which when used together can be employed in the transportation of long logs or timbers, and which when not required for this purpose can be disconnected and used independently as trucks for hauling other objects or shorter logs, and which when used together may be caused to "track," the log supporting means being so constructed and mounted as to avoid cramping or twisting, and prevent undue strains upon the parts of the vehicle.

Further objects and advantages of the invention will appear in the course of the following description, it being understood that changes in the form, preparation, and details of construction may be resorted to within the scope of the appended claim, without departing from the spirit of the invention.

In the drawings Figure 1 is a side view of a convertible vehicle constructed in accordance with the invention. Fig. 2 is a plan view of the same showing the elements in the positions which they assume in rounding a curve or turning a corner. Fig. 3 is a rear view of one of the trucks. Fig. 4 is a detail sectional view to show the mounting of the bunks. Fig. 5 is a detail view in perspective of the coupling forming the connection joint.

The convertible vehicle embodying the invention consists essentially of a forward truck 10 and a rearward truck 11 respectively having fixed or rigid rear axles 12 and 13 and pivotal front axles 14 and 15, with a jointed connection 16 between said trucks consisting of members 17 and 18, of substantially equal lengths measured from the vertical planes of the rear axle of the front truck and the front axle of the rear truck and being pivotally united at 19, whereby in rounding a curve or turning a corner the forward end of the rear truck is led through the connection in a direction causing the wheels of the rear truck to track those of the front truck.

In the construction illustrated the member 17 of the jointed connection is formed as an extension of the usual reach 20 of the forward truck while the member 18 consists of a short tongue mounted in the usual way in the front hounds 21 of the rear truck. The coupling between the members of the connection should be of such construction as to permit of the relative lateral swinging movement of said members and at the same time permit a limited vertical relative movement thereof, and to this end may consist as shown of a clevis 22 on one of the members carrying the removable pivot bolt hereinbefore referred to as 19 and an eye 23 carried by the other member and engaged with said pivot bolt, the interval between the arms of the clevis being such as to permit the indicated vertical movement of one member relatively to the other to provide for differences in the level of the truck wheels due to unevennesses of the surface of the ground. The forward truck is provided in connection with its front axle with the usual hounds 24 and draft tongue 25. Also mounted in the usual way in reference to both trucks are the front rocking bolsters 26 and rear bolsters 27 and connecting the front and rear bolsters and holding those of each truck in relatively fixed positions are tables 28 and 29, each preferably comprising a central or rest timber 30—31 and side guide timber 32—33, to support the forward and rear pivotal bunks 34—35. These bunks may be of the ordinary and well known construction having the terminal chocks 36 and being removably pivoted as at 37 and 38 respectively upon said tables.

As illustrated in Fig. 2, and hereinbefore mentioned, the turning of the forward truck serves to lead the rearward truck outwardly of the curve through the agency of the connection between the trucks and at the same time the bunks of the forward and rear trucks are permitted to retain their parallelism held by the load consisting of long timbers or logs supported at their ends respectively by said bunks, so that the trucks turn under the bunks and hence under the load without disturbing the latter, and in order to compensate for the relative shortening of the distance between the trucks in making the turn, and which, if provision were not made therefor would result in the sliding of the load or of one of the bunks with reference to the load, the bunk of the rearward truck has its pivot bolt 38 mounted in a slot 39 disposed longitudinally of the table and held normally at the forward end of said slot by means of a spring 40 or its equivalent. Therefore as the trucks are deflected in rounding a curve or corner, the bunks retain not only their parallelism but their distance, the rearward bunk being pushed backward relatively to the truck in opposition to the tension of said spring, and hence there is no disturbance whatsoever of the load and strain upon the vehicle is minimized. As the trucks resume their normal or straight position, the rear bunk is returned by the spring to its normal position relatively to the truck.

With a construction such as described, the longest timbers can be hauled readily and, when the vehicle is not required for that purpose, the trucks may be disconnected simply by the removal of the pivot bolt 19 and either truck may be used independently for other purposes or for hauling short logs or timbers, a tongue of the ordinary length being substituted as to the rear truck for the short tongue 18, and as the table of each truck is removably secured in place by means of bolts 41 or similar fastening devices, wagon bodies of any preferred form or construction can be substituted therefor.

Having thus described the invention, what is claimed is:

A vehicle having a plurality of trucks provided with pivotal front axles, and an intermediately jointed connection between the rear axle of the forward truck and the front axle of the rearward truck, tables supported respectively by the front and rear bolsters of said trucks, bunks pivotally mounted respectively upon said tables, the pivot of one of said bunks being mounted in a longitudinal slot in its table, and yielding means for maintaining the pivot of said last mentioned bunk in its normal position.

In testimony that I claim the foregoing as my own, I have hereto affixed my signature in the presence of two witnesses.

CICERO H. LA CROIX.

Witnesses:
G. W. GRAY,
A. BRYAN.